Sept. 9, 1969  W. J. NEWILL  3,466,477

INDUCTION MOTOR SPEED SENSING APPARATUS

Filed June 7, 1967

INVENTOR.
William J. Newill
BY
Robert W. Smith
ATTORNEY

United States Patent Office 3,466,477
Patented Sept. 9, 1969

3,466,477
INDUCTION MOTOR SPEED SENSING APPARATUS
William J. Newill, Dayton, Ohio, assignor to General Motors Corporation, Detroit, Mich., a corporation of Delaware
Filed June 7, 1967, Ser. No. 644,368
Int. Cl. H02k 11/00
U.S. Cl. 310—68
4 Claims

ABSTRACT OF THE DISCLOSURE

In a preferred embodiment a speed sensing device for a dynamoelectric machine is provided within the machine structure by a pair of magnetic coil transducers placed on opposite ends of a stator tooth portion. The machine rotor member includes slots oriented at an angle with respect to the axis of the stator so that rotation of the rotor causes different induced currents in the transducers. The induced currents are combined to produce an output signal responsive to the rotor speed.

---

This invention relates to dynamoelectric machine speed sensing apparatus and more particularly to an improved speed sensing arrangement mounted within a winding core structure to produce signals responsive to the rotor speed.

In the past the speed of an electric motor has been detected either by measuring the motor voltage or current or by a shaft mounted tachometer device. The accuracy of the voltage and current measuring techniques is sometimes limited and the use of a tachometer involves accessories attached to the motor shaft which are expensive, bulky, and impossible to provide in some motor applications.

The present invention provides an improved speed sensing transducer which is integral with a dynamoelectric machine core structure such as provided in an induction motor. The motor magnetic fields are utilized for sensing speed without substantial effect upon the fields. An induction motor, for example, includes stator and rotor laminated cores with conductor receiving slots separated by tooth portions. To produce speed signals a pair of coil windings are wound at opposite ends of one of the stator core teeth. The rotor slots of a conventional squirrel-cage motor are aligned at an angle to the stator axis, or skewed, to provide a more constant air gap reluctance and therefore more uniform torque. Accordingly, a non-uniform reluctance path is distributed across each stator tooth, and the ends of each tooth have respectively different instantaneous reluctance paths. The varying reluctance provides induced voltages in the coils in response to the rotation of the rotor. The stator tooth coils are connected so that the induced voltages of each are opposing and the voltage difference provides a differential voltage at the output of the transducer circuit. The main magnetic field is eliminated leaving the combined coil transducer signals generated primarily by rotor movement. The use of the sensing transducers, therefore, does not seriously distort the motor fields.

Accordingly, an object of this invention is to provide an integral dynamoelectric machine magnetic speed sensing transducer responsive to the relative rotation between the tooth portions of the stator and rotor core members.

Another object of the invention is to provide an induction motor with a pair of magnetic field sensing devices secured to a stationary portion of the machine for producing a differential induced current responsive to a rotating skewed tooth portion of the machine rotor without substantial distortion of the main magnetic fields within the motor.

It is a further object of the invention to provide a squirrel-cage induction motor with inductance transducer coils wound on tooth portions of the motor stator with the stator tooth including a permanent magnet field so that the coils produce an induced speed signal responsive to the combined effects of magnetic fields within the motor and the variation of the transducer reluctance by rotation of skewed tooth portions of the rotor without disruptive reorientation of the motor field.

Further objects and advantages of the invention will be apparent from the following description reference being had to the accompanying drawings wherein preferred embodiments of the present invention are clearly shown.

Figure 1:
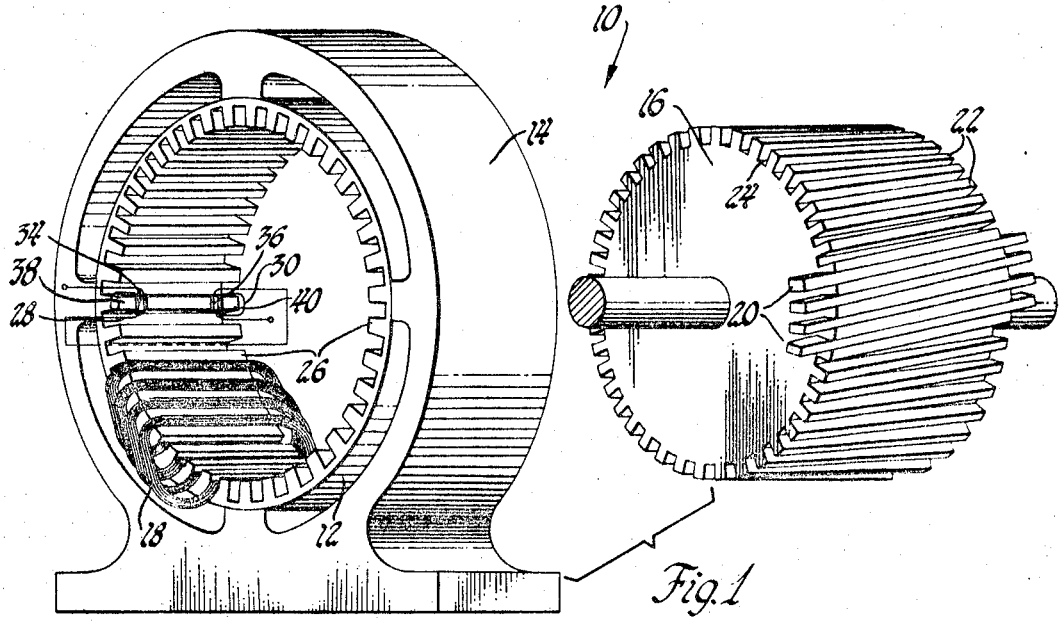
FIGURE 1 is a perspective view of a squirrel-cage induction motor showing a pair of transducer windings wound on the opposite ends of a tooth portion of a stator core.

Referring now to the drawings and more particularly to FIGURE 1 a dynamoelectric machine is illustrated which takes the form of an induction motor 10 having a stator core 12 suitably supported in the motor housing 14 and a squirrel-cage rotor core 16. The stator and rotor cores are both of a conventional type which includes laminations of magnetic material having slots formed therein. Stator field windings, partially shown at 18, and copper bars, partially shown at 20, are secured in the slots of the stator and rotor respectively. The ends of copper bars 20 are short circuited by copper end rings, not shown, to which the bars are welded or brazed.

A conventional squirrel-cage rotor includes skewed rotor teeth 22 defining skewed rotor slots 24 which receive rotor bar inductors 20. The slots are aligned at an angle to the rotor shaft normally referred to as the "skew angle" in conventional squirrel-cage motors. Stator teeth 26 are shown aligned along the longitudinal axis of the stator core which coincides with the axis of the rotor shaft. Accordingly, the rotor teeth 22 are oriented at an angle to the stator teeth 26.

A pair of transducers 28 and 30 are placed at opposite ends of a stator tooth in a preferred embodiment of this invention. The stator tooth includes a pair of cutout portions or notches 34 and 36 forming tooth end portions 38 and 40 each being approximately ten percent of the total tooth length. The notches are formed by conventional machining techniques or provided in the laminations prior to assembly of laminated core structure. Coil windings which form magnetic field sensing transducers 28 and 30 are respectively placed on the tooth end portions 38 and 40 which form coil cores. The coils are wound with opposite polarities so that current induced in the coils will be opposite and substractive in a series circuit. The size and number of coil turns is determined by the magnetic fields of the motor and desired output signal. The wire leads of the coil windings are connected in series to a pair of output terminals 42 and 44. Terminals 42 and 44 provide an output connection to either a motor speed control circuit or speed monitoring meter, not shown.

Figure 2:
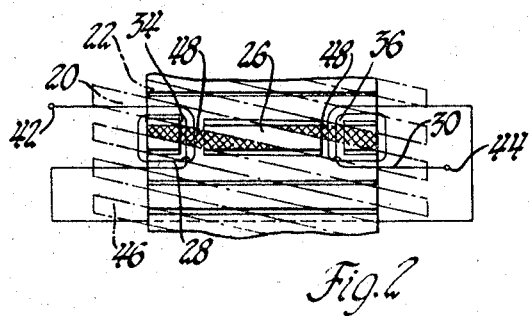
FIGURE 2 is a plan view of a portion of the stator teeth of FIGURE 1 and illustrating the overlapping position of the rotor teeth relative to the stator teeth.

In FIGURE 2 the phantom lines 46 illustrate the relationship of the skewed rotor bars 20 and teeth 22 with respect to the stator teeth 26. The shaded areas 48 indicate that rotor teeth 22 will overlap different areas of a stator tooth 26 as it passes. As the alternate rotor bars 20 and rotor teeth 22 pass, a low reluctance path is provided by the tooth overlapping areas 48. The changing reluctance results in a changing magnetic flux which induces a voltage in each of the coils. The coil transducers 28 and 30 will be exposed at any instant to different amounts of magnetic flux because of varying reluctance paths due to the skewed rotor teeth. It can be seen that the peak voltage of each coil will occur at different instants so that there will always be a difference of voltage between the opposing induced coil voltages.

If the rotor teeth were not skewed then the reluctance paths of both coils would be the same and the induced coil voltages would cancel. In operation of the apparatus of this invention, as illustrated in FIGURES 1 and 2, the induction motor 10 operates in a conventional manner. Field windings 18 are connected to a conventional alternating current power source, not shown, and a stator field is produced which rotates electromagnetically. The rotor bars 20 form a short circuited rotor winding which has an induced current providing the rotor field. The rotor field travels with respect to the stator field and the two fields interlock to produce a torque at the rotor shaft. As a rotor tooth passes the transducers 28 and 30, induced voltages are generated in the coils of the transducers responsive to the relative rotation between the tooth members of the rotor and stator. An instantaneous output signal appears at terminals 42–44 that is the difference of the voltages induced in the coils. By using only the difference of the voltages as the output signals, the main motor flux is thereby eliminated although the speed signal is generated by rotation of the rotor. The effect of the sensing coils upon the motor fields is minimized while still producing a signal having a frequency proportional to the shaft speed. Either of the transducer coils 28 or 30 will have a voltage related to the motor speed but by connecting both in opposing polarity a differential signal is provided varying as each rotor tooth passes a stator tooth.

Figure 4:
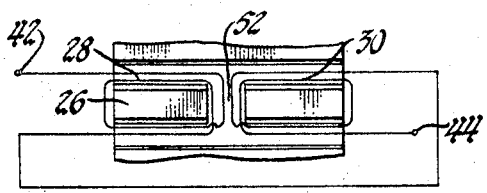
FIGURE 4 is an alternative embodiment of the pickup shown in FIGURE 1 wherein a single notch is formed in a stator tooth to receive two coil windings.

FIGURE 4 illustrates an alternative embodiment wherein a single cutout or notch 52 is provided toward the center of one stator tooth 26 and both coils 28 and 30 are received in the notch portion. Accordingly, the area of coils is enlarged so that additional flux is impressed in each coil transducer.

Figure 3:
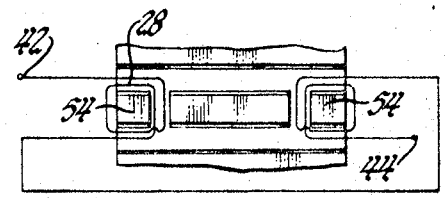
FIGURE 3 is a plan view of a portion of the stator of FIGURE 1 illustrating a magnetic pickup arrangement made in accordance with this invention and utilizing a pair of permanent magnets.
Figure 5:
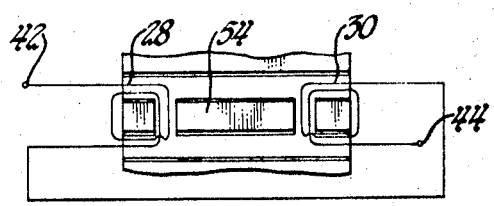
FIGURE 5 is an alternative embodiment of FIGURE 3 illustrating a magnetic pickup arrangement with a permanent magnet added to the tooth portion of a stator intermediate the two coil windings.

FIGURES 3 and 5 illustrate modifications of the magnetic pickup arrangements shown in FIGURES 1 and 2 to be used when the motor fields do not produce satisfactory pickup signals for the transducers. A pair of permanent magnets 54 are used in FIGURE 3 positioned at the ends of the stator tooth that form the core portions for the transducer coils. In FIGURE 5, the permanent magnet 54 is included in the stator tooth part between the wound core portions. The skewed rotor teeth 22 will vary the reluctance paths between the permanent magnet 54 and the transducer coils as explained hereinabove in connection with FIGURE 2. The field of the permanent magnet adds to the motor field flux to increase the voltages induced in the transducer coils.

While the embodiments of the present invention as herein disclosed constitute preferred forms it is understood that other forms might be adopted without departing from the scope of the invention as defined in the appended claims. For example, different magnetic pickup configurations may be utilized and the transducer position on the core structure may vary in different arrangements to also provide an output signal responsive to the rotation of the rotor slots and teeth.

I claim:

1. A dynamoelectric machine comprising, slotted stator and rotor magnetic core members with the slots of said members mutually extending at a predetermined angle and said stator and rotor members including groups of electrical conductors that produce a main flux field within said machine when at least one group of conductors is connected to a source of electrical power, a pair of magnetic flux transducers each mounted on an end portion of a tooth part formed by the slots by one of said members, circuit means connecting said pair of magnetic flux transducers and a pair of output terminals, said pair of transducers being constructed and arranged so as to develop signals of opposite polarity as the magnetic reluctance of said tooth varies by rotation of said rotor whereby said output terminals provide rotor speed responsive signals without substantial effect upon said main flux field.

2. A squirrel-cage induction motor comprising, laminated stator and rotor members each including slotted cores, field windings secured within the slots of said stator member for producing a rotating electro-magnetic field, conductive bar inductors secured within said rotor slots for producing an induced magnetic field in torque producing relationship with the stator field, said rotor slots extending at a predetermined angle with the longitudinal axis of the stator slots, said stator core member including a pair of transducer coils each wound on portions of a tooth segment at opposite ends of the stator core, said pair of transducer coils having opposite winding polarities and connected serially with a pair of output terminals, said stator and rotor magnetic fields inducing voltages of respectively opposing polarity in each of said transducer coils in response to the changes of reluctance provided by the teeth of said rotor member passing said coils whereby the difference of said opposing voltages provides periodic signals responsive to the speed of said rotor member without substantial distortion of the motor magnetic fields.

3. A squirrel-cage induction motor comprising, laminated stator and rotor members each including slotted cores, field windings secured within the slots of said stator member for producing a rotating electromagnetic field, conductive bar inductors secured within said rotor slots for producing an induced magnetic field in torque producing relationship with the stator field, the said rotor slots extending at a predetermined angle with the longitudinal axis of the stator slots, said stator and rotor slots forming tooth portions with one tooth of said stator including a pair of notches forming tooth end portions, first and second transducer coils respectively wound on said tooth end portions, said rotor tooth portions forming varying reluctance paths along said one stator tooth so that the instantaneous magnet flux of one transducer coil is different from the magnetic flux of the other coil, said coils being interconnected and arranged to develop opposite polarity voltages when the reluctance of said reluctance paths is periodically varied with rotation of said rotor, and output terminal means connected to said transducer coils for providing rotor speed signals produced by the difference of the voltages induced in said first and second transducer coils.

4. A squirrel-cage induction motor comprising, laminated stator and rotor members each including slotted cores, field windings secured within the slots of said stator member for producing a rotating electromagnetic field, conductive bar inductors secured within said rotor slots for producing an induced magnetic field in torque producing relationship with the stator field, said rotor slots extending at a predetermined angle with the longitudinal axis of the stator slots, said stator core member including a pair of transducer coils each wound on portions of a tooth segment at opposite ends of the stator core, said tooth segment carrying a permanent magnet, said pair of transducer coils having opposite winding polarities and connected serially with a pair of output terminals whereby the magnetic fields of said permanent magnet and of said motor windings induce a voltage of opposite polarity in each of the respective transducer coils which are variable in response to the changes of reluctance provided by the teeth of said rotor member passing said coils, the voltage signals appearing at said output terminals being responsive to the combined opposing voltages of said coil to provide a signal corresponding to speed of said rotor member.

References Cited

UNITED STATES PATENTS

| | | | |
|---|---|---|---|
| 2,912,631 | 11/1959 | Luenberger | 310—190 |
| 3,206,668 | 9/1965 | Rozmus | 310—68 |
| 3,329,852 | 7/1967 | Saussele | 318—326 |
| 3,339,095 | 8/1967 | Schlabach | 310—66 |
| 3,408,556 | 10/1968 | Gabor | 310—68 |

J. D. MILLER, Primary Examiner

U.S. Cl. X.R.

310—67, 125, 160, 171; 318—326; 324—70